(12) United States Patent
Elowson et al.

(10) Patent No.: US 12,515,945 B2
(45) Date of Patent: Jan. 6, 2026

(54) THIN FILMS AND METHODS OF FABRICATION THEREOF

(71) Applicant: The Regents of the University of California, Oakland, CA (US)

(72) Inventors: Michael J. Elowson, Hillsborough, CA (US); Rohan Dhall, El Cerrito, CA (US); Adam Schwartzberg, Richmond, CA (US); Shaul Aloni, El Cerrito, CA (US); Stefano Cabrini, Albany, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 767 days.

(21) Appl. No.: 17/700,780

(22) Filed: Mar. 22, 2022

(65) Prior Publication Data

US 2022/0306460 A1    Sep. 29, 2022

Related U.S. Application Data

(60) Provisional application No. 63/167,443, filed on Mar. 29, 2021.

(51) Int. Cl.
*B81C 1/00*   (2006.01)
*B81B 3/00*   (2006.01)

(52) U.S. Cl.
CPC ........ *B81C 1/00158* (2013.01); *B81B 3/0021* (2013.01); *B81B 2203/0127* (2013.01); *B81C 2201/0132* (2013.01); *B81C 2201/0133* (2013.01); *B81C 2201/0176* (2013.01)

(58) Field of Classification Search
CPC ........ B81C 1/00158; B81C 2201/0132; B81C 2201/0133; B81C 2201/0176; B81C 1/00182; B81B 3/0021; B81B 2203/0127
See application file for complete search history.

(56) References Cited

U.S. PATENT DOCUMENTS

| | | | |
|---|---|---|---|
| 6,261,943 B1* | 7/2001 | Grupp | B81B 3/0035 438/619 |
| 2018/0239240 A1* | 8/2018 | Houweling | G03F 1/62 |
| 2019/0056654 A1* | 2/2019 | Péter | G03F 1/38 |

OTHER PUBLICATIONS

Johnson et al., "A brief review of atomic layer deposition: from fundamentals to applications," Materials Today, vol. 17, No. 5, pp. 236-246, (Jun. 2014).

(Continued)

*Primary Examiner* — Steven B Gauthier
*Assistant Examiner* — Sun Mi Kim King

(57) ABSTRACT

This disclosure provides methods and apparatus related to thin films. In one aspect, a silicon wafer with a first silicon nitride layer disposed on a first side of the silicon wafer and a second silicon nitride layer disposed on a second side of the silicon wafer is provided. A first side of the first silicon nitride layer is disposed on the first side of the silicon wafer. The second silicon nitride layer is patterned. The silicon wafer is etched to expose the first side of the first silicon nitride layer. A polymer is deposited on a second side of the first silicon nitride layer. A first ceramic layer is deposited on the polymer disposed on the second side of the first silicon nitride layer using an atomic layer deposition process. The first silicon nitride layer and the polymer are etched to expose a first side of the first ceramic layer.

20 Claims, 6 Drawing Sheets

(56) References Cited

OTHER PUBLICATIONS

George, "Atomic Layer Deposition: An Overview," Chemical Reviews, vol. 110, No. 1, pp. 111-131, (Nov. 30, 2009).
Lu et al., "Ultrathin Free-Standing Oxide Membranes for Electron and Photon Spectroscopy Studies of Solid-Gas and Solid-Liquid Interfaces," Nano Letters, vol. 20, No. 9, pp. 6364-6371, (Aug. 5, 2020).
Ciarlo, "Silicon Nitride Thin Windows for Biomedical Microdevices," Biomedical Microdevices, vol. 4, No. 1, pp. 63-68, (2002).
Dwyer et al., "Through a Window, Brightly: A Review of Selected Nanofabricated Thin-Film Platforms for Spectroscopy, Imaging, and Detection," Applied Spectroscopy, vol. 71, No. 9, pp. 2051-2075, (May 12, 2017).
Gorham, "A New, General Synthetic Method for the Preparation of Linear Poly-p-xylylenes," Journal of Polymer Science: Part A-1, vol. 4, pp. 3027-3039, (Apr. 18, 1966).
Grant et al., "Transmission electron microscopy 'windows' for nanofabricated structures," Nanotechnology, vol. 15, pp. 1175-1181 (Jul. 16, 2004).
Nasim et al., "A review of high-strength nanolaminates and evaluation of their properties," Journal of Materials Science & Technology, vol. 50, pp. 215-244, (Jan. 11, 2020).
Molzen et al., "Materials and techniques used in nanostructure fabrication," Journal of Vacuum Science and Technology, vol. 16, pp. 269-272, (Dec. 18, 1978).
Ortigoza-Diaz et al., "Techniques and Considerations in the Microfabrication of Parylene C microelectromechanical Systems," Micromachines, vol. 9, No. 422 (Aug. 22, 2018).
See, "KOH Etching of Bulk Silicon," The Nanofab at University of Alberta, pp. 1-3, (Jul. 5, 2021).
Williams, "Thermal Decomposition of poly(a, a, a', a'-tetrafluoro-p-xylylene) in Nitrogen and Oxygen," Journal of Thermal Analysis, vol. 49, pp. 589-594, (1997).
Wu et al., "Surface Reaction and Stability of Parylene N and F Thin Films at Elevated Temperatures," Journal of Electronic Materials, vol. 24, No. 1, pp. 53-58, (1995).
Graaf et al., "The Tynode: A new vacuum electron multiplier," Nuclear Instruments and Methods in Physics Research A, vol. 847 pp. 148-161, (2017).
Elowson et al., "Fabrication of ultrathin suspended membranes from atomic layer deposition films," Journal of Vacuum Science and Technology, B 40, pp. 023001-1 thru 023001-8, (Jan. 7, 2022).
Chan et al., "Ultra-thin corrugated metamaterial film as large-area transmission dynode," JINST, pp. 1-19, (Nov. 19, 2021).
Wang et al., "Ultrathin Oxide Films by Atomic Layer Deposition on Graphene," Nano Letters, vol. 12, No. 7, pp. 3706-3710, (Jun. 20, 2012).
Chan et al., "Secondary electron emission from multi-layered TiN/Al2O3 transmission dynodes," Journal of Instrumentation, vol. 16, pp. 1-25, (Jul. 15, 2021).

\* cited by examiner

THIN FILMS AND METHODS OF FABRICATION THEREOF

RELATED APPLICATIONS

This application claims priority to U.S. Provisional Patent Application No. 63/167,443, filed Mar. 29, 2021, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to thin films and methods of fabrication thereof.

BACKGROUND

Ultrathin (e.g., less than about 100 nanometer (nm)) suspended membranes are used in a wide variety of microelectronic and materials science applications, including sensors, filters, microfuel cells, and sample supports, where they serve as barriers. These membranes may be only several to hundreds of atoms thick. Many electron and photon characterization techniques benefit from such ultrathin sample supports, or "windows," which minimize scattering of the incident radiation and thereby improve the signal-to-noise ratio from the sample of interest.

Ultrathin membranes are often fabricated using techniques that have been standardized by the semiconductor and microelectromechanical system (MEMS) industries, allowing for scalable production. Microfabrication of a suspended membrane can be performed by growth or deposition of the membrane film on a substrate, followed by the removal of the support materials under it to yield a freestanding structure. Since the membrane film is several orders of magnitude thinner than the substrate, it is very fragile in comparison. Therefore, the ability to release such a film without damage requires a highly selective process that effectively removes the substrate, but it has minimal effect on the membrane material.

For example, silicon-rich silicon nitride (SiN) is the most common material for microfabricated ultrathin membranes, favored for its low tensile stress, mechanical robustness, and simple and inexpensive fabrication. The simple fabrication of SiN membranes is enabled by the very high selectivity of low-pressure chemical vapor deposited (LPCVD) SiN to silicon in potassium hydroxide (KOH) etching, estimated to range from approximately 1:30 000 to 1:50 000. This high level of selectivity is required to release ultrathin membranes without damage, but only a limited number of material combinations offer it. Therefore, the fabrication process often needs to be designed specifically around the issue of material selectivity; i.e., the membrane material is limited by its resistance to the etch process used to release it.

More recently, two-dimensional materials such as graphene, hexagonal boron nitride, and molybdenum sulfide have been suspended as atomically thin membranes that offer unique material properties. However, these two-dimensional materials are not yet compatible with standard fabrication techniques, meaning that they cannot be suspended using scalable methods. Rather, the films must be isolated separately and manually transferred onto a perforated support, which often results in folds, wrinkles, and adhesion issues that limit their usable area and reproducibility.

By solving this problem of material selectivity, and doing so with scalable methods, one could make ultrathin membranes from a much wider variety of materials, enabling membrane-based sensors, filters, or sample supports with customizable properties. For example, electrical or thermal conductivity, surface chemistry, optical and/or electron transparency, etc. can be tuned based on the needs of the application.

SUMMARY

Described herein is a fabrication process for suspending ultrathin films with thicknesses as low as about 4 nanometers (nm) and lateral dimensions up to about 20 microns× 1000 microns from a variety of materials. In some embodiments, the materials are grown by atomic layer deposition. In some embodiments, a silicon nitride membrane serves as the support for a sacrificial polymer layer and an ultrathin atomic layer deposition film that, after plasma etching, will form the membrane. The high chemical selectivity between atomic layer deposition-grown transition metal nitrides and oxides and the sacrificial polymer means that ultrathin films of a variety of materials can be released without damage using a single process.

In some embodiments, electrically conductive titanium nitride membranes can be produced by this method. These membranes are of significant interest for electron microscopy applications. Electron transparency of titanium nitride membranes was found to be about 14% higher than silicon nitride of the same thickness, and of similar conductivity to graphite, meaning that ultrathin, conductive, and electron transparent membranes can be fabricated at scale. These membranes are ideal supports for electron and photon characterization techniques, as well as microelectromechanical system applications that require a conductive membrane.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 4A-4C show an example of a normalized EDX signal for elements of interest taken from the front and back surfaces of a 55 nm thick TiN membrane. For each element, EDX counts are normalized to the average signal measured from the front surface for that element. Back surfaces were measured after various durations of the final Parylene etch, and the relative amount of signal for each element can be tracked as the duration of etching increases. At 13.5 min, there is excess carbon, suggesting incomplete Parylene removal. From 27 min onward, the carbon level on the back surface is lower than that from the front surface and stays consistent, but oxidation and fluorination increase from extended exposure to reactive species in the reactive ion etching (RIE) chamber.

FIG. 5A shows a spatial thickness map showing contamination on the membrane over an approximate 300 nm×300 nm area. A line profile was taken over the area framed by the drawn rectangle. FIG. 5B shows a line profile from the framed area, showing a relative thickness of 0.14 for the membrane.

DETAILED DESCRIPTION

Figure 1A:
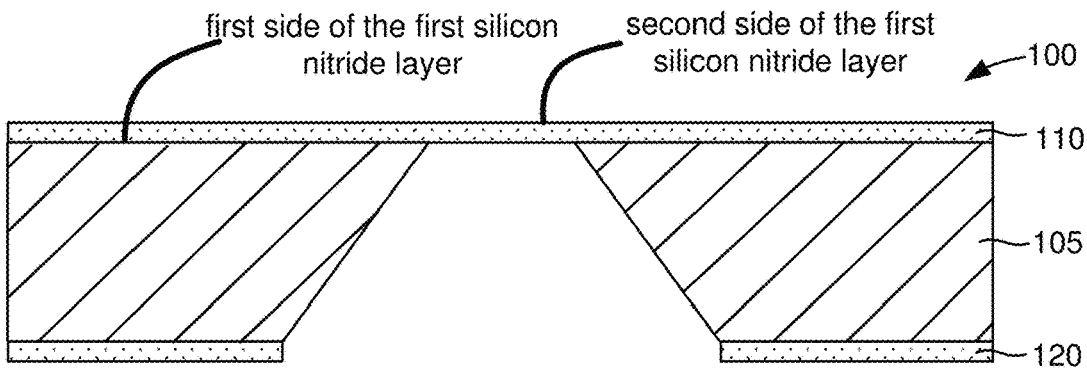
FIGS. 1A-1D show examples of schematic illustrations of a structure during the fabrication process for a thin film.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The terms "substantially" and the like are used to indicate that a value is close to a targeted value, where close can mean, for example, the value is within 80% of the targeted value, within 85% of the targeted value, within 90% of the targeted value, within 95% of the targeted value, or within 99% of the targeted value.

Note that the terms "membrane," "thin film," "ultrathin film," and "window" are used interchangeably throughout this document.

Atomic layer deposition (ALD) is an increasingly prominent technique capable of depositing a wide variety of ceramic materials with exceptional quality using self-limiting growth. Even down to several nanometers in thickness, ALD films are uniform, conformal, and pinhole-free. ALD can also be used to alternate nanoscale films of two or more materials, creating composites or "nanolaminates" which are among the strongest materials ever synthesized. Nanolaminates offer a high level of customizability based on the materials selected and arrangement of the films. Materials can be arranged such that the beneficial properties of each are well utilized. Additionally, nanolaminates can be tuned to exhibit unique physical traits as the layer thickness becomes less than or equal to the length scale that defines the property.

ALD offers the flexibility, precision, and film quality necessary for ultrathin membrane applications, including electron-transparent windows, metamaterials, tynodes, nanopores, solid-oxide fuel cells, insulating layers, and mechanical studies. Though these applications successfully use ALD films as suspended structures, they are all limited in their fabrication by either material selectivity or scalability. Specifically, most reports in the scientific literature use a fluorine-based dry etch process as the final release step, limiting the membrane material to one that is chemically resistant to fluorine. Other reports use suspended graphene or amorphous carbon as a support layer onto which the ALD film is deposited, requiring a manual transfer of the support layer before the ALD film can be deposited. This process is not scalable.

As described herein, a fabrication process that yields ultrathin membranes from a variety of materials using a single flexible and scalable process has been developed. By utilizing a sacrificial polymer, a high level of selectivity in the final membrane release step can be introduced. The polymer is etched using a low power oxygen plasma, which many transition metal nitrides and oxides are resistant to. Therefore, a wide variety of ceramics can be released as ultrathin membranes with high yield, without the need to perfect the final release etch or tune it to the specific material being released. The flexibility and precision of ceramic layer deposition techniques, coupled with the ability to combine multiple materials to form nanolaminates, allow for membranes with tunable properties that can be customized to the needs of the application.

Figure 6:
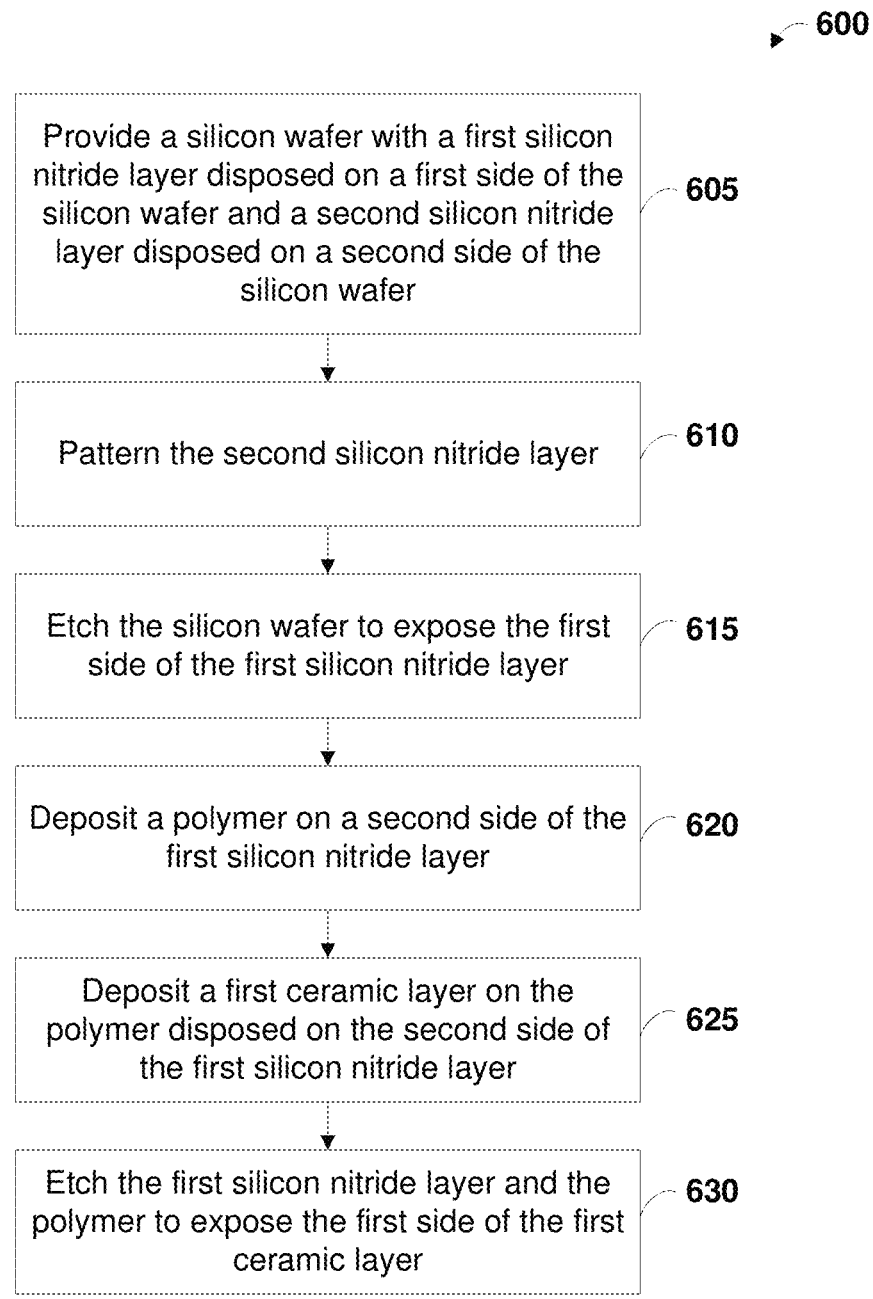
FIG. 6 shows an example of a flow diagram illustrating a fabrication process for a thin film.

FIG. 6 shows an example of a flow diagram illustrating a fabrication process for a thin film. FIGS. 1A-1D show examples of schematic illustrations of a structure during the fabrication process for a thin film.

Starting at block 605 of the process 600, a silicon wafer with a first silicon nitride layer disposed on a first side of the silicon wafer and a second silicon nitride layer disposed on a second side of the silicon wafer is provided. A first side of the first silicon nitride layer is disposed on the first side of the silicon wafer. In some embodiments, the silicon wafer is about 100 microns to 800 microns thick, about 50 microns to 525 microns thick, about 100 microns to 300 microns thick, about 150 to 250 microns thick, or about 200 microns thick. In some embodiments, the first silicon nitride layer and the second silicon nitride layer are each about 10 nanometers (nm) to 200 nm thick, about 10 nm to 100 nm thick, about 15 nm to 50 nm thick, about 30 nm to 70 nm thick, about 50 nm thick, or about 100 nm thick. In some embodiments, the silicon nitride is deposited on the silicon wafer using a low-pressure chemical vapor deposition (LPCVD) process. The LPCVD process deposits the silicon nitride on all exposed surfaces of the silicon wafer, including both sides of the silicon wafer.

At block 610, the second silicon nitride layer is patterned. The term "patterning," as used herein, can include masking as well as etching processes. At block 610, a portion of the second silicon nitride layer is etched and removed to expose the silicon wafer.

At block 615, the silicon wafer is etched to expose the first side of the first silicon nitride layer. This etching process occurs at the portion of the silicon wafer exposed by the operation at block 610. In some embodiments, the silicon wafer is etched using a potassium hydroxide solution. In some embodiments, the operation at block 615 creates a silicon nitride membrane or window.

FIG. 1A shows an example of a structure at this point (e.g., up through block 615) in the process 600. As shown in FIG. 1A, the structure 100 includes a silicon wafer 105, a first silicon nitride layer 110 disposed on a first side of the silicon wafer 105, and a second silicon nitride layer 120 disposed on a second side of the silicon wafer 105. The second silicon nitride layer 120 has been patterned to expose the silicon wafer 105 that was subsequently etched to expose the first side of the first silicon nitride layer 110.

Returning to FIG. 6, at block 620, a polymer is deposited on a second side of the first silicon nitride layer. In some embodiments, the polymer is about 100 nm to 400 nm thick, about 150 nm to 250 nm thick, or about 200 nm thick. In some embodiments, when the polymer is deposited, it is only deposited on the second side of the first silicon nitride layer. The deposition process used to deposit some polymers (e.g., polymethyl methacrylate, a polyimide, or polystyrene) allow for this. In some embodiments, the polymer comprises polymethyl methacrylate or a polyimide. In some embodiments, the polymer comprises polystyrene. In some embodiments, the polymer comprises polystyrene that is exposed to ultraviolet light in a nitrogen environment. Exposing polystyrene to ultraviolet light in a nitrogen environment increases its resistance to dissolution in solvents (e.g., dichloromethane, acetone, and isopropanol).

In some embodiments, when the polymer is deposited, it is deposited on all exposed surfaces of the structure. The deposition process used to deposit some polymers (e.g., poly-para-xylylenes (e.g., Parylene C)) result in the deposition of the polymer on all exposed surfaces. In some embodiments, the polymer is deposited on the second side of the first silicon nitride layer and the first side of the first silicon nitride layer, as well as the silicon wafer, and the second silicon nitride layer. In some embodiments, the polymer comprises a poly-para-xylylene.

Figure 1B:
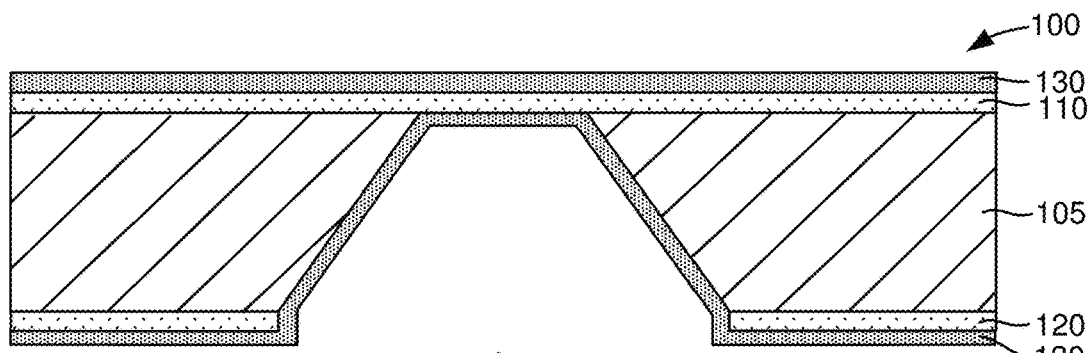

FIG. 1B shows an example of a structure at this point (e.g., up through block 620) in the process 600. The structure shown in FIG. 1B is a structure in which the polymer is deposited on all exposed surfaces of the structure. As shown in FIG. 1B, the structure 100 includes the silicon wafer 105, the first silicon nitride layer 110 disposed on the first side of the silicon wafer 105, the second silicon nitride layer 120 disposed on the a second side of the silicon wafer 105, and a polymer 130 disposed on the second side of the first silicon nitride layer 110, the first side of the first silicon nitride layer 110, the silicon wafer 105, and the second silicon nitride layer 120.

Returning to FIG. 6, at block 625, a first ceramic layer is deposited on the polymer disposed on the second side of the first silicon nitride layer. A first side of the first ceramic layer is disposed on the polymer. In some embodiments, the first ceramic layer is deposited using an atomic layer deposition process. In some embodiments, the first ceramic layer is deposited using a plasma-enhanced atomic layer deposition process.

In some embodiments, the first ceramic layer comprises a ceramic. In some embodiments, the first ceramic layer comprises an electrically conductive ceramic. In some embodiments, the first ceramic layer comprises a metal nitride. In some embodiments, the first ceramic layer is a ceramic from a group of titanium nitride, niobium nitride, zirconium nitride, molybdenum nitride, tungsten nitride, tantalum nitride, hafnium nitride, vanadium nitride, scandium nitride, and a ternary nitride compound. In some embodiments, the ternary nitride compound includes nitrogen and two elements from a group of titanium, niobium, zirconium, molybdenum, tungsten, aluminum, tantalum, hafnium, vanadium, scandium, yttrium, indium, gallium, calcium, and magnesium. In some embodiments, the first ceramic layer comprises a metal oxide. In some embodiments, the first ceramic layer comprises aluminum oxide. In some embodiments, the first ceramic layer is a ceramic from a group of aluminum oxide, cobalt oxide, hafnium oxide, molybdenum oxide, niobium oxide, silicon oxide, titanium oxide, tungsten oxide, magnesium oxide, zirconium oxide, tantalum oxide, vanadium oxide, scandium oxide, yttrium oxide, indium oxide, boron oxide, and gallium oxide.

In some embodiments, the first ceramic layer is about 1 nm to 100 nm thick, about 1 nm to 3 nm thick, or about 4 nm to 55 nm thick.

Figure 1C:
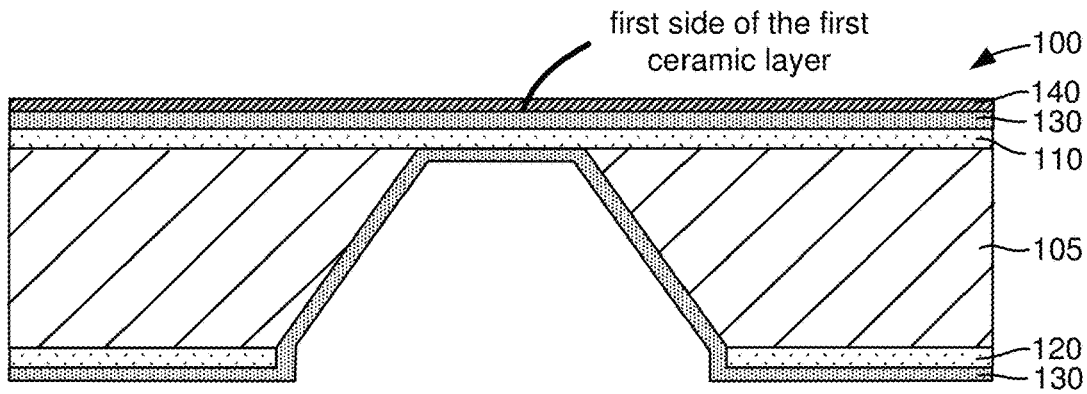

FIG. 1C shows an example of a structure at this point (e.g., up through block 625) in the process 600. The structure shown in FIG. 1C is a structure in which the polymer is deposited on all exposed surfaces of the structure. As shown in FIG. 1C, the structure 100 includes the silicon wafer 105, the first silicon nitride layer 110 disposed on the first side of the silicon wafer 105, the second silicon nitride layer 120 disposed on the second side of the silicon wafer 105, the polymer 130 disposed on the second side of the first silicon nitride layer 110, the first side of the first silicon nitride layer 110, the silicon wafer 105, and the second silicon nitride layer 120. A first ceramic layer 140 is disposed on the polymer 130 disposed on the second side of the first silicon nitride layer 110.

Returning to FIG. 6, at block 630, in embodiments in which the polymer is only deposited on the second side of the first silicon nitride layer at block 620, the first silicon nitride layer and the polymer (i.e., the polymer disposed on the first silicon nitride layer) are etched to expose the first side of the first ceramic layer. In some embodiments, the first silicon nitride layer is etched with a plasma including a fluorinated gas (e.g., trifluoromethane, difluoromethane, carbon tetrafluoride, octafluorocyclobutane, or sulfur hexafluoride) that is combined with oxygen, nitrogen, methane, or hydrogen. In some embodiments, the first silicon nitride layer is etched using a plasma containing a fluorocarbon, hydrofluorocarbon, or sulfur hexafluoride and oxygen, nitrogen, methane, or hydrogen. In some embodiments, the first silicon nitride layer is etched using a trifluoromethane/oxygen plasma. In some embodiments, the first silicon nitride layer is etched using a plasma that contains fluorine ions and radicals. In some embodiments, the first silicon nitride layer is etched using a chemically reactive plasma. In some embodiments, the first silicon nitride layer is etched using a fluorine-based plasma. In some embodiments, the first silicon nitride layer is etched using a fluorine-containing plasma. In some embodiments, the first silicon nitride layer is etched using a fluorine-bearing gas plasma. In some embodiments, the polymer is etched using an oxygen plasma.

In embodiments in which the polymer is deposited all exposed surfaces of the structure at block 620, the polymer (i.e., the polymer disposed on the first side of the first silicon nitride layer), the first silicon nitride layer, and the polymer (i.e., the polymer disposed on the second side of the first silicon nitride layer) are etched to expose the first side of the first ceramic layer. In some embodiments, the polymer disposed on the first side of the first silicon nitride layer is etched using an oxygen plasma. In some embodiments, the first silicon nitride layer is etched with a plasma including a fluorinated gas (e.g., trifluoromethane, difluoromethane, carbon tetrafluoride, octafluorocyclobutane, or sulfur hexafluoride) that is combined with oxygen, nitrogen, methane, or hydrogen. In some embodiments, the first silicon nitride layer is etched using a plasma containing a fluorocarbon, hydrofluorocarbon, or sulfur hexafluoride and oxygen, nitrogen, methane, or hydrogen. In some embodiments, the first silicon nitride layer is etched using a trifluoromethane/oxygen plasma. In some embodiments, the first silicon nitride layer is etched using a plasma that contains fluorine ions and radicals. In some embodiments, the first silicon nitride layer is etched using a chemically reactive plasma. In some embodiments, the first silicon nitride layer is etched using a fluorine-based plasma. In some embodiments, the first silicon nitride layer is etched using a fluorine-containing plasma. In some embodiments, the first silicon nitride layer is etched using a fluorine-bearing gas plasma. In some embodiments, the polymer disposed on the second side of the first silicon nitride layer is etched using an oxygen plasma.

Figure 1D:
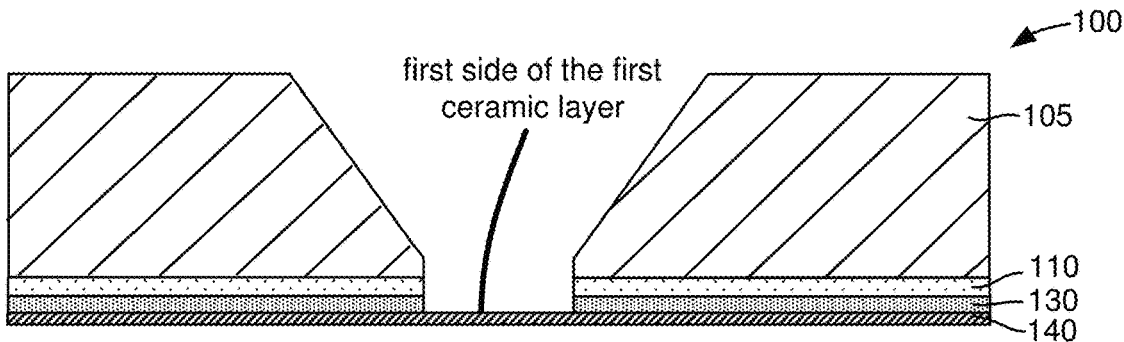

FIG. 1D shows an example of a structure at this point (e.g., up through block 630) in the process 600. The structure shown in FIG. 1D is a structure in which the polymer is deposited on all exposed surfaces of the structure. As shown in FIG. 1D, the structure 100 includes the silicon wafer 105 and the first silicon nitride layer 110 disposed on the first side of the silicon wafer 105. The first ceramic layer 140 is disposed on the polymer 130 disposed on the second side of the first silicon nitride layer 110. The polymer 130 disposed on the first side of the first silicon nitride layer 110, the first silicon nitride layer 110, and the polymer 130 disposed on the second side of the first silicon nitride layer 110 have been etched to expose the first side of the first ceramic layer 140. A portion of the first ceramic layer 140 does not have any materials disposed thereon, yielding a thin, unsupported thin film.

In some embodiments, a composite thin film (i.e., a film with two or more layers of different ceramics) or a nanolaminate can be fabricated. For example, in some embodiments, one or more additional ceramic layers can be deposited on the first ceramic layer prior to block 630.

In some embodiments, prior to block 630, a second ceramic layer is deposited on the first ceramic layer. In some embodiments, the second ceramic layer is deposited using an atomic layer deposition process. In some embodiments, the second ceramic layer is deposited using a plasma-enhanced atomic layer deposition process. In some embodiments, the second ceramic layer comprises a different ceramic than the first ceramic layer.

In some embodiments, the second ceramic layer comprises a metal oxide. In some embodiments, the second ceramic layer comprises aluminum oxide. In some embodiments, the second ceramic layer is a ceramic from a group of aluminum oxide, cobalt oxide, hafnium oxide, molybdenum oxide, niobium oxide, silicon oxide, titanium oxide, tungsten oxide, magnesium oxide, zirconium oxide, tantalum oxide, vanadium oxide, scandium oxide, yttrium oxide, indium oxide, boron oxide, and gallium oxide.

In some embodiments, the first ceramic layer comprises a metal oxide. In some embodiments, the second ceramic layer comprises an electrically conductive ceramic. In some embodiments, the second ceramic layer comprises a metal nitride.

In some embodiments, the second ceramic layer is about 1 nm to 100 nm thick, about 1 nm to 3 nm thick, or about 4 nm to 55 nm thick.

In some embodiments, prior to block 630, a third ceramic layer is deposited on the second ceramic layer. In some embodiments, the third ceramic layer comprises the same ceramic as the first ceramic layer. In some embodiments, the third ceramic layer comprises a different ceramic than the first and second ceramic layers.

The ceramic layer deposition processes can be used to form composite layers comprising two or more ceramic layers. In some embodiments, in such composite layers, each ceramic layer may be about 1 nm to 3 nm thick. For example, a silicon oxide ($SiO_2$)/titanium nitride (TiN) composite layer can be fabricated. With alternating $SiO_2$ (13 layers) and TiN (12 layers), with each layer being about 1-3 nm thick, a 25 layer composite layer may be about 50 nm thick. As another example, a titanium nitride (TiN)/aluminum oxide ($Al_2O_3$) composite layer can be fabricated. With alternating TiN (3 layers) and $Al_2O_3$ (2 layers) layers, with each layer being about 1 nm to 3 nm thick, a 5 layer composite layer may be about 11 nm thick.

In some embodiments, to improve the adhesion of the polymer to the second side of the first silicon nitride layer, an adhesion layer is deposited. In some embodiments, the adhesion layer is deposited on the second side of the first silicon nitride layer. In some embodiments, the adhesion layer is deposited on all exposed surfaces of the structure. In some embodiments, the adhesion layer is an adhesion layer from a group of 3-(trimethoxysilyl)propyl methacrylate (e.g., A-174), hexamethyldisilazane, 2-(methylthio)ethyl methacrylate, 4-chlorothiophenol, and (3-aminopropyl)triethoxysilane (e.g., VM-651 and VM-652).

In some embodiments, prior to block 630, a polymer is deposited on the first or topmost ceramic layer. In some embodiments, the polymer is deposited on the first or topmost ceramic layer with a spin coating process. In some embodiments, the polymer is poly(methyl methacrylate) (PMMA) or polystyrene. In some embodiments, the polymer is removed after block 630. For example, PMMA or polystyrene can be removed using a solvent (e.g., dichloromethane, acetone, and isopropanol).

The following examples are intended to be examples of the embodiments disclosed herein, and are not intended to be limiting. In the examples, membranes ranging from 4 nm to 55 nm in thickness, with lateral dimensions up to 20 microns×1000 microns. Titanium nitride (TiN) was used as an initial membrane material due to its electrical conductivity, low atomic number, hardness, corrosion resistance, and biocompatibility.

Example—Fabrication of Membranes, Silicon Nitride Windows

SiN membranes, or "windows," serve as a scaffold for the creation of a new membrane in subsequent steps and were made using well-established microfabrication methods.

The fabrication of the film, summarized in FIGS. 1A-1D, was performed on 200 micron thick, double-side polished silicon wafers coated with 50 nm of low-stress (<250 MPa) LPCVD SiN. Photolithography was used to pattern rectangular geometries on the wafer backside, and reactive ion etching was used to transfer the pattern from the photoresist to SiN, using $CHF_3$ and $O_2$ gas chemistry with a 48/2 SCCM $CHF_3/O_2$ ratio, 55 mTorr of pressure, 20° C. as the table temperature, and 25 W of forward power in an reaction ion etcher (RIE). The SiN etch rate was measured via ellipsometry and found to be approximately 9 nm/min. The patterned backside SiN then served as a mask for etching through the silicon substrate in 30% KOH solution heated to 80° C., which etched silicon at approximately 80 microns/h. The silicon substrate was etched along the [111] crystal planes to create inverse-pyramid trenches sloping at 54.7°. Where the patterned geometries were large enough, KOH etched all the way through the silicon until it reached SiN on the opposite face of the wafer, forming rectangular SiN membranes. Where the geometries were not large enough, the silicon etching self-terminated as the [111] planes met either along a straight line or at a single point. Long, narrow rectangular geometries were used to create V-shaped grooves in this way, thinning the silicon along these lines for cleaving into smaller pieces and individual chips (see FIG. 1A).

Example—Fabrication of Membranes, Deposition of Sacrificial and Membrane Materials The SiN windows then served as a base from which to fabricate the ALD-based membranes. A simple process would be to deposit the ALD film directly on the SiN window, then etch SiN from the backside via reactive ion etching to release the membrane. However, physical bombardment from the ions can easily create pinholes, cracks, or tears in an ALD film of only a few nanometers in thickness. Avoiding any ion bombardment of the ALD film from over-etching SiN would require a very uniform etch, with a very accurate measure of the SiN thickness and etch rate.

Therefore, another sacrificial layer was introduced, Parylene-C, as it can be removed with high selectivity to ALD-grown ceramics using a low power oxygen plasma, with little consequence to over-etching. Further, a dry etch process allows one to avoid immersion of fragile membranes in a liquid etch bath, increasing the likelihood that the membranes stay intact through the final release step.

Parylene-C not only provides high selectivity but also is insoluble in typical cleanroom solvents. A polymer that dissolves or delaminates in solvents would otherwise lift-off the ALD layer and ruin the membrane during any cleaning. Parylene's resilience in liquids also allows subsequent lithography steps to be conducted, for example, to pattern metal electrodes or the membrane film itself, as lithography typically requires immersion in a solvent or base for resist development.

Yet further, Parylene is deposited in the gas phase using the Gorham Process, a gas-phase chemical vapor deposition process that conformally coats all surfaces and is less likely to break the SiN windows compared to a liquid-based coating process. Therefore, Parylene coats both sides of the wafer, and both sides of the SiN windows (see FIG. 1B). Parylene-C was deposited from di-chloro-di-p-xylylene dimer. Depositions ranged from 180 nm to 300 nm in thickness, measured via profilometry.

Following Parylene deposition, a membrane material was then deposited at a specified thickness by ALD. There is great flexibility in the membrane material, as most ALD materials are ceramics that are highly resistant to oxygen plasma. ALD also allows one to deposit multiple films in a variety of arrangements, with control over each film's thickness.

ALD depositions were conducted in an Oxford FlexAl Plasma-Enhanced ALD (Oxford Instruments, Oxford, United Kingdom), with deposition parameters dependent on the material and deposition temperature. Growth rates were determined by ellipsometric measurements, which were used to calculate the thickness of the ALD films, and, therefore, the released membranes, based on the number of deposition cycles. The thickness of the TiN films grown by ALD ranged from 4 nm to 55 nm.

As a polymer, Parylene-C has a limited thermal budget, with a melting temperature of 290° C. Though previous reports have indicated that Parylene-C can be safely annealed for several hours at 300° C., the depositions were limited to 100° C. to protect the cleanliness and vacuum level of the ALD chamber. However, other variants of Parylene such as Parylene F and AF-4 are stable at higher temperatures, and these variants could potentially be substituted into the process to allow for ALD depositions at 300° C. for increased film crystallinity, hardness, and elastic modulus.

Deposition of the membrane material via ALD resulted in a stack of thin films built from the SiN windows. Under the ALD membrane material was the frontside layer of Parylene-C, SiN, and finally the backside layer of Parylene-C (see FIG. 1C).

Example—Fabrication of Membranes, Membrane Release Via Backside Etching

To release the membrane, the three support layers were removed via a sequence of reactive ion etches. These etches need to be selective enough to fully remove their intended support material, while leaving no residues and minimizing any damage to the ultrathin ALD film.

The etches were conducted in a reactive ion etcher (RIE). Because the samples lie face down in the RIE, polymethyl methacrylate PMMA was first spun on the top surface at 2000 rpm, leaving a protective layer of PMMA approximately 400 nm in thickness. The PMMA was baked in a convection oven at 110° C. for 30 min. Because this PMMA layer is not patterned, uniformity of the resist is less important and, therefore, a bake temperature lower than the recommended temperature of 170° C. was acceptable.

In the RIE, the backside layer of Parylene-C was first etched using a low power oxygen plasma. The recipe uses 50 SCCM of $O_2$, 80 m Torr of pressure, 20° C. as the table temperature, and 20 W of the forward power. The etch rate was measured via profilometry and found to be approximately 20 nm/min. However, Parylene residues were leftover even after over-etching by 50%. Therefore, the extended etches were used to ensure that all Parylene residues were removed. Considerations on residues and over-etching are discussed further below.

Next, the LPCVD SiN layer was etched using $CHF_3/O_2$ gas chemistry with a 48/2 SCCM ratio, 55 m Torr of pressure, 20° C. as the table temperature, and 50 W of forward power. It was found that increasing the forward power from 25 W to 50 W did a better job in preventing SiN residues. The etch rate was found to be approximately 17 nm/min; however, a 100% over-etch was used to ensure that all residues were thoroughly removed.

Finally, the frontside layer of Parylene-C, which is directly under the ALD layer, was etched using the aforementioned oxygen plasma recipe and was also over-etched to prevent residues. Because this is the final etch step in releasing the membrane, this etch is where the high selectivity and gentle processing are critical in minimizing damage such as pinholes, cracks, or tears in the ultrathin ALD layer.

Figure 2A:
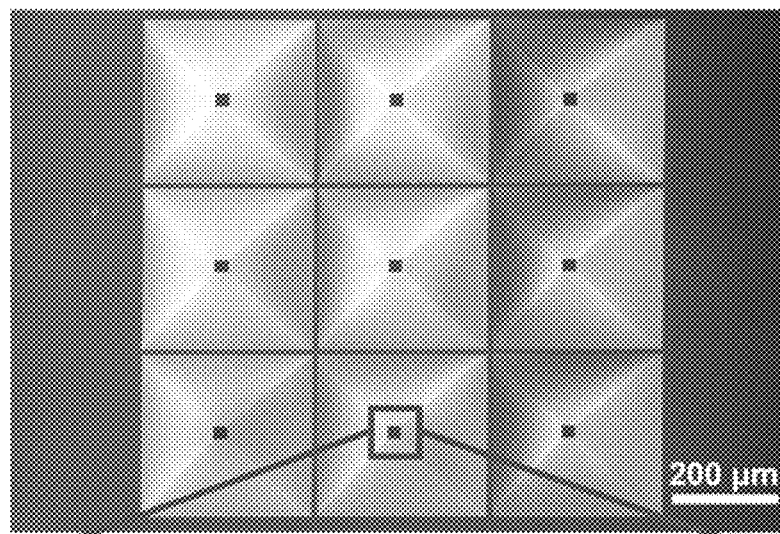
FIGS. 2A-2C show an example of a finished TiN membrane, approximately 8 nm in thickness with lateral dimensions of 20 microns×20 microns, imaged from the backside. The release etches were specified to give a clean membrane surface with no residues. Membrane thickness was calculated from ALD deposition rates that were measured via ellipsometry. TiN films deposited at 100° C. were measured to be approximately as conductive as graphite.
Figure 2B:
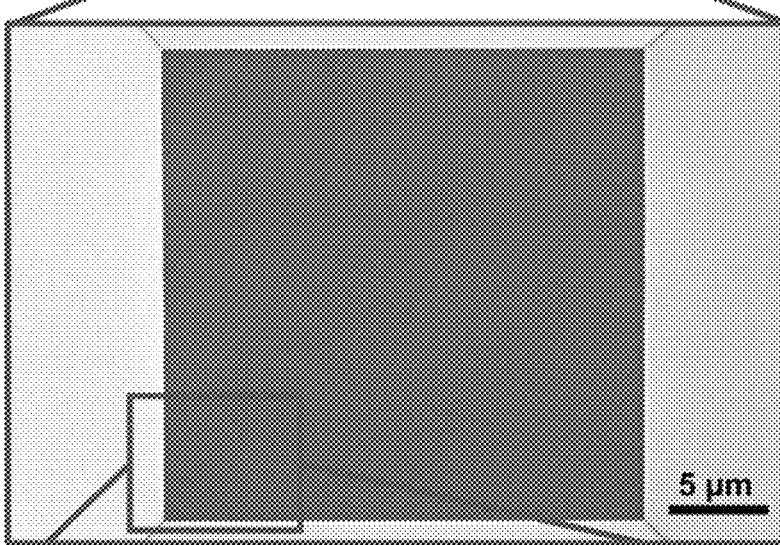
Figure 2C:
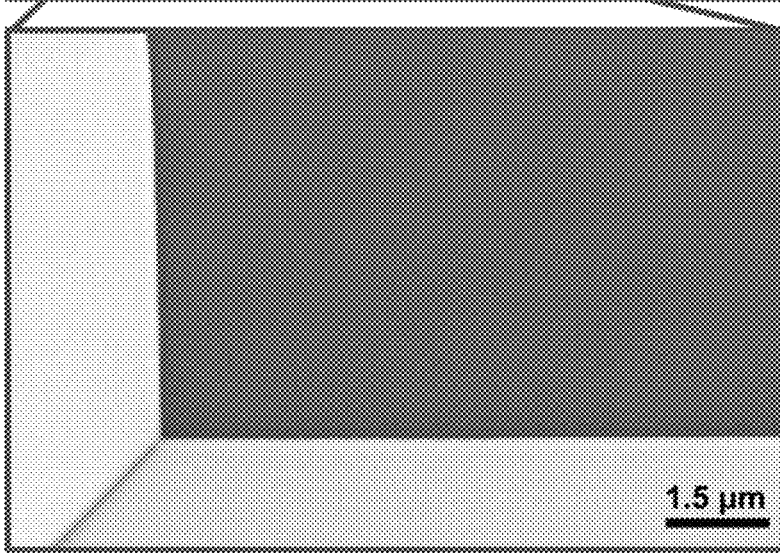

The resulting membranes were composed of the ALD layer with the protective PMMA still on the surface. Before use, the samples were cleaved into individual chips and submerged in dichloromethane for 30 s to remove the PMMA, followed by dips in acetone and isopropanol to promote a clean surface. The ALD film was then completely isolated as an ultrathin membrane (see FIG. 1D). Scanning electron microscope (SEM) images of a finished membrane are shown in FIGS. 2A-2C.

Example—Final Backside Etches

Successful fabrication of a suspended membrane requires that the membrane film is properly released without damage. Specifically, the support materials must be fully removed with minimal residues leftover. Achieving this requires that the final etches are performed such that they fully remove their intended material, but they are simultaneously selective and gentle enough to not damage the membrane film.

In performing these etches, characterization of the etch rate via ellipsometry or cross-sectional imaging was not sufficient, as they did not capture the possibility for residues leftover on the surface. Therefore, the backsides of the chips and membranes were inspected before and after each etch step by SEM. Parameters such as etch time and forward power were varied to determine their effect on the leftover residues from each support material.

Figures 3A, 3B, 3C, 3D, 3E, 3F:
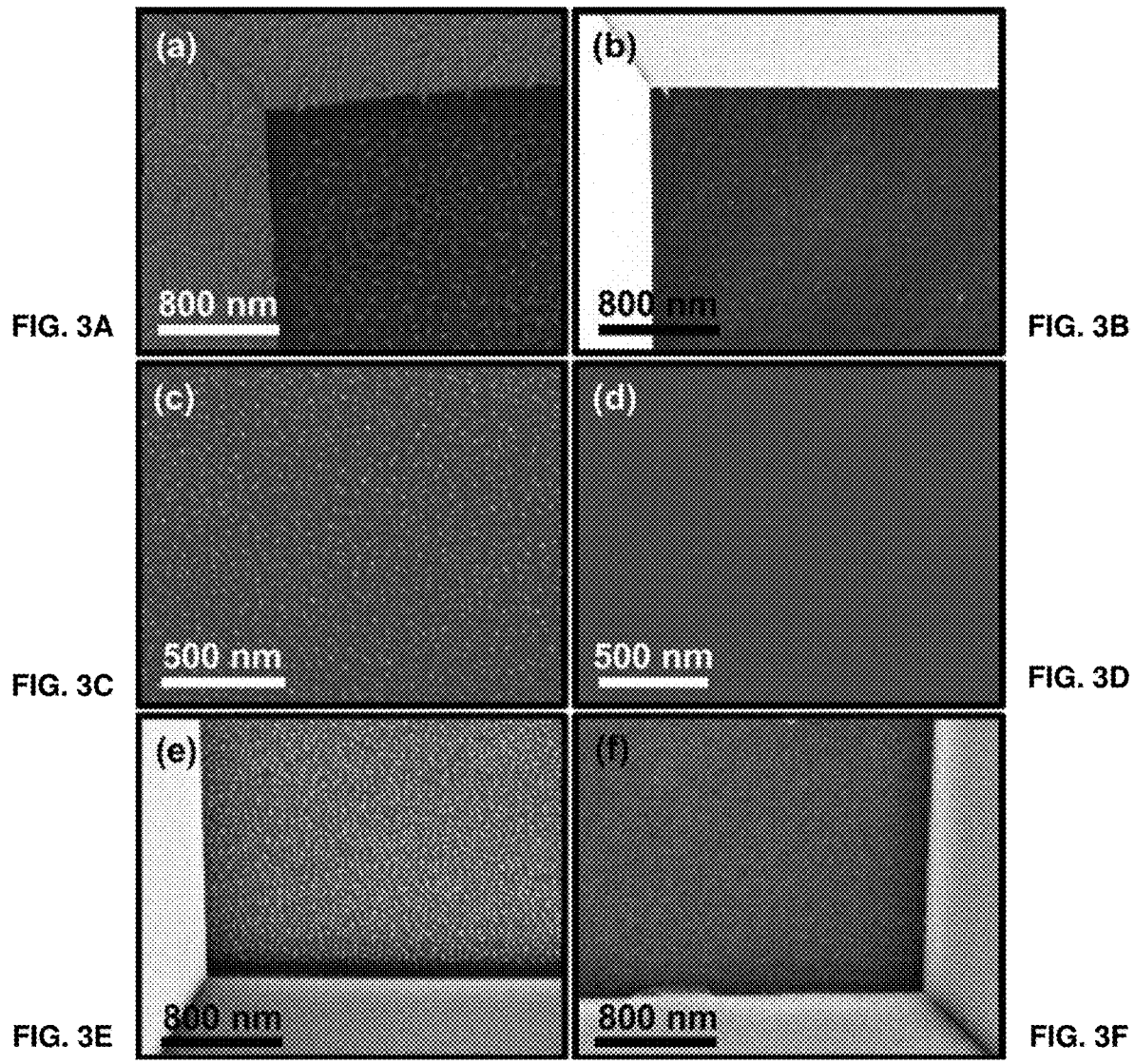
FIGS. 3A-3F show examples of adjustment to backside reactive ion etches. Partial backside ALD coverage (FIG. 3A), addressed via larger borders and better contact with carrier wafer (FIG. 3B). Incomplete SiN removal at 25 W of forward power (FIG. 3C), addressed by increasing to 50 W (FIG. 3D). Parylene residues leftover even with 50% over-etch (FIG. 3E), addressed by using a 200% over-etch (FIG. 3F).

A consistent source of residues on the backside of the membranes was not a result of incomplete etches, but rather a partial backside coverage from the ALD deposition. As a conformal deposition method, ALD precursors are able to diffuse through small gaps between the sample and carrier wafer and partially coat the back surface. Even in areas far from any visible border, this can create a web-like network of partial ALD coverage. This backside coverage masks the other etches, meaning that the support materials are not removed in these covered areas. However, because the ALD layer is so thin, there is not enough texture or contrast to see this backside coverage via SEM until after the first Parylene etch, as shown in FIG. 3A.

This issue was sufficiently addressed by depositing on samples with larger borders around the individual window chips, and by using new, clean carrier wafers to promote better contact. However, future work will include fabrication of a custom carrier that can seal the edges of the substrate in order to prevent this backside coverage.

It was also found that the standard SiN etch recipe used was not sufficient for a residue-free removal of SiN. It is hypothesized that this is not noticeable when making SiN windows, because the KOH solution can still easily access silicon and etch through the wafer. It was found that doubling the forward power from 25 W to 50 W did a good job at eliminating SiN residues, as shown in FIG. 3D, even when the etch time was lowered to compensate for the difference in etch rate.

Finally, EDX was used to characterize the final release etch on finished 55 nm thick TiN membranes. To determine whether the support materials were fully removed, particularly the final layer of Parylene, measurements were taken from the front and back membrane surfaces and compared for various etch durations. It was assumed that if the amount of carbon detected on the front and back surfaces of the membranes were equal, the final Parylene layer was fully removed. This could also be verified visually in the SEM to confirm a lack of residues. Measuring zero carbon to confirm complete Parylene removal is not feasible, as there is always some carbon impurity in the ALD film and adhered to the surface from exposure to atmosphere.

EDX is not particularly surface-sensitive; however, the acceleration voltage of the electron beam was minimized to balance adequate signal and x-ray generation with surface sensitivity. Measurements were taken at 2 kV, which for TiN results in an estimated interaction depth of 60 nm. Measurements were taken on chips that underwent between 13.5 min and 81 min of final Parylene etching, representing a 50%-800% over-etch for a 180 nm thick Parylene layer etched at 20 nm/min.

X-ray photoelectron spectroscopy (XPS) is highly surface-sensitive due to its low interaction depth, and, therefore, may be more appropriate for these measurements. However, XPS was not used here because the available system's electron detector is placed at an angle such that there is no signal from the bottom of the 54.7° sloped trench where the back surface of the membrane is found. The larger x-ray spot size in XPS also makes it difficult to measure only the membrane area without the inclusion of other areas such as the trench. However, future work will include angle-resolved XPS measurements on larger windows using a tilted sample holder.

Figure 4A:
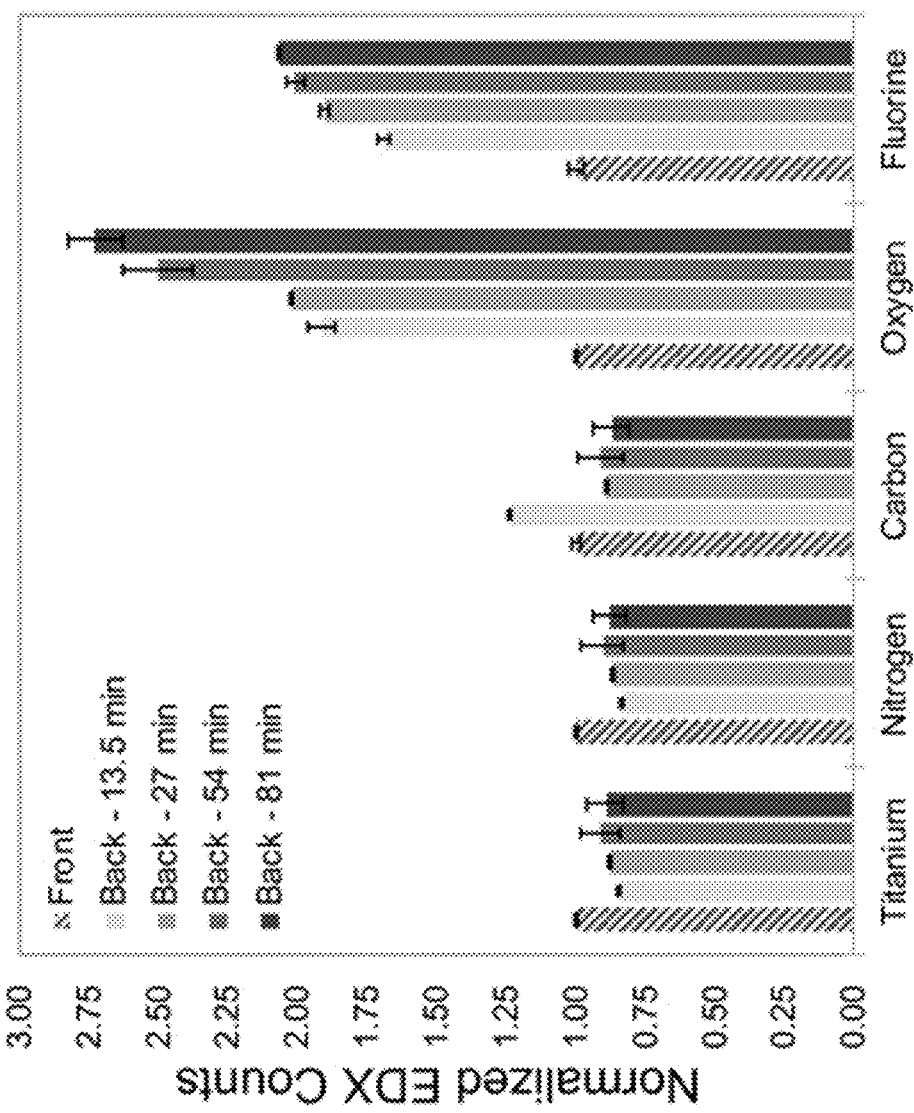
Figure 4A:
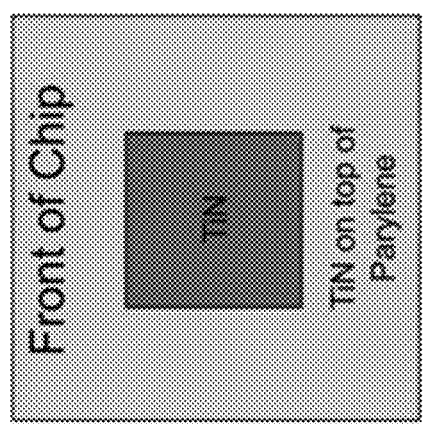
Figure 4B:
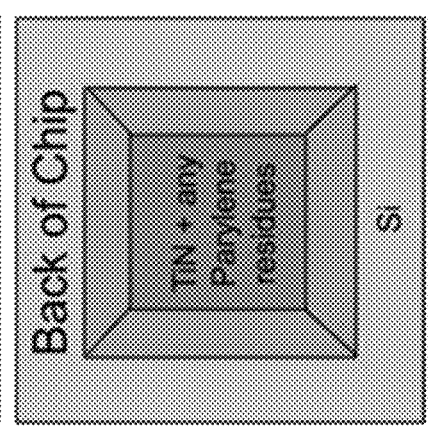

FIGS. 4A-4C show the chemical signals measured by EDX for various durations of the final etch. For each element, EDX counts are normalized to the average signal measured from the front surface for that element. The relative amount of these chemical species on the back surface can be tracked as the duration of etching increases and compared to the signal from the front surface. A carbon signal less than or equal to that from the front surface suggests that the final Parylene layer has been fully removed and the surface has gone from under- to over-etched. At 13.5 min of etching, there is a higher level of carbon on the back surface compared to the front, suggesting that there is still Parylene present. Visible residues on this sample are also shown in FIG. 3E. The 27 min etch represents a 200% over-etch and the resultant level of carbon on the back surface is slightly lower than the front. As the length of final etching increases to 54 min and finally 81 min, the level of carbon stays consistent, but oxidation and fluorination on the back surface increase. This is due to the extended exposure of the back surface to oxygen plasma. The increase in fluorination may be due to leftover fluorine in the RIE chamber from the SiN etch, as vacuum is not typically broken between the final etch steps. In general, the slightly lower signal for titanium, nitrogen, and carbon from the back versus the front surfaces may be a result of the trench from which the emitted x-rays must escape. For the flat front surface, there is a more direct path between the scan area and the detector.

The similar levels of carbon measured on the front and back surfaces after 27 min, coupled with the lack of residues imaged by SEM, suggest a complete removal of the support materials and successful release of the membrane. Therefore, it was determined that a 200% over-etch in the final etch step is sufficient in removing all Parylene, though there is excess oxidation and fluorination of the back surface. A 100% over-etch was also used for later fabrication batches, with similar success, but was not characterized with EDX.

Through the development of the fabrication process, it became apparent that over-etching was necessary at each step in order to eliminate residues from the back surface of the membrane. The ability to over-etch each support layer, even to drastic levels, is made possible by the combination of support materials used and their selectivity during each etch step. Specifically, Parylene can be heavily over-etched with an oxygen plasma without damaging the SiN or ALD layers. SiN can be over-etched at higher powers, with enough selectivity to Parylene to not etch through the final support layer. This is representative of the flexibility and convenience that this fabrication process allows. Ultrathin membranes of a variety of materials can be fabricated without the need to perfect the final release etch or tune it to the specific material being released.

Example—Electron Transparency by EELS

TiN membranes 10 nm in thickness were imaged by STEM using a 200 kV beam acceleration voltage. The TiN layer was observed to be nanocrystalline by electron diffraction imaging, with very limited diffraction observed through the membrane, suggesting the suitability of its nanostructure as a TEM sample support. The membrane was also stable throughout prolonged exposure to the electron beam with a dose typical for bright-field TEM imaging ($\sim100$ e Å$^{-2}$ s$^{-1}$).

Figure 5A:
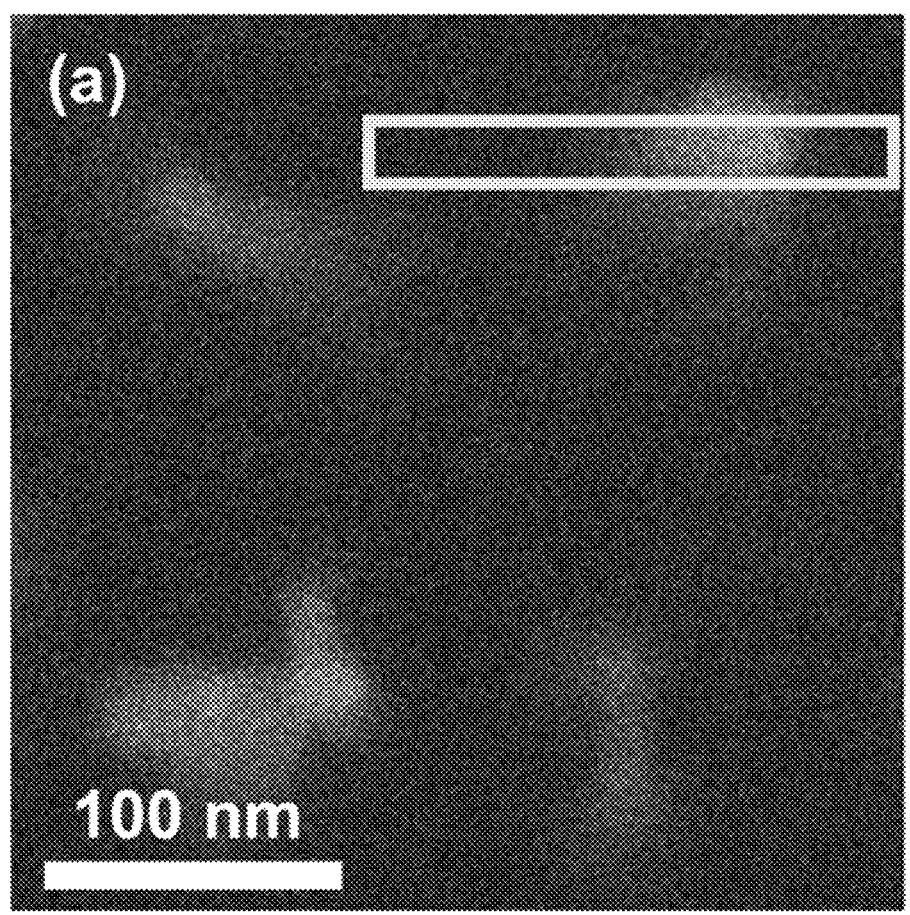
FIGS. 5A and 5B show an example the characterization of a 10 nm thick TiN membrane using EELS using STEM imaging.
Figure 5B:
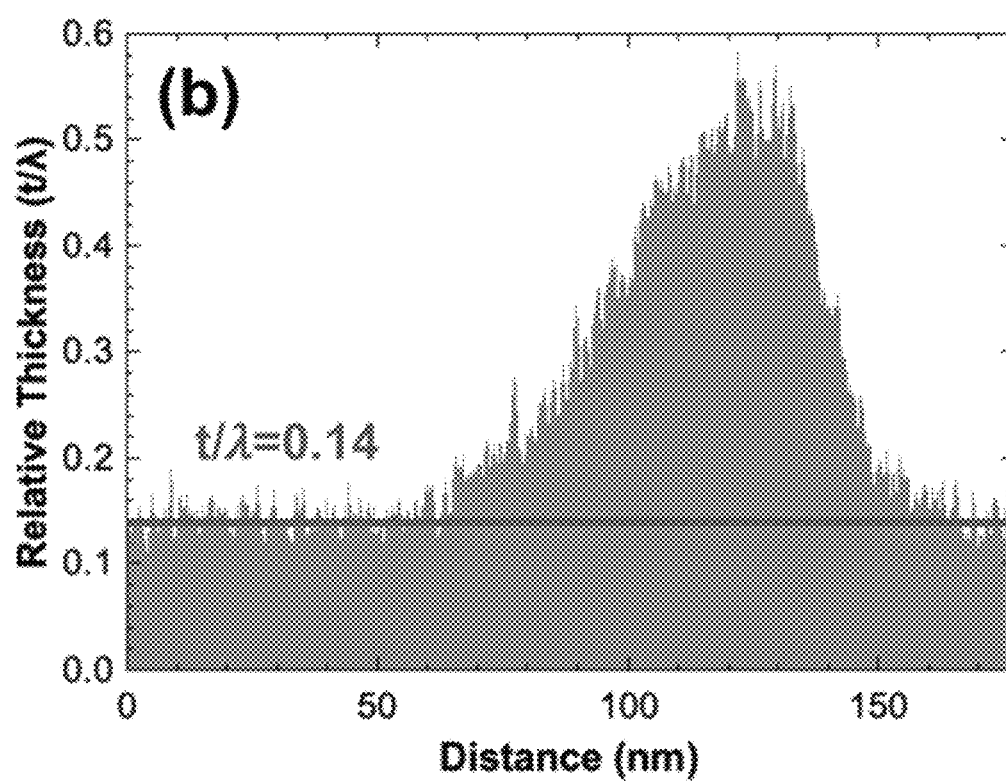

A spatial thickness map was taken using electron energy loss spectroscopy (EELS) over an approximate area of 300 nm×300 nm on the membrane, shown in FIG. 5A. Brighter areas represent bits of contamination on the membrane, where the thicker material results in more high-angle electron scattering, and darker areas represent the TiN membrane itself. A rectangular profile was taken across one area of contamination, and the intensity of transmitted electrons that do not lose energy (zero-loss) is compared to the total transmitted intensity using the "log-ratio" formula, $$t/\lambda = -\ln(I_0/I_t) = -\ln(T),$$

where $I_0$ is the zero-loss intensity, $I_t$ is the total transmitted intensity, and sample thickness (t) is reported in units of the inelastic mean free path ($\lambda$), a measure known as "relative thickness." The electron transmission (T) can be taken as the ratio of zero-loss intensity to total intensity. From FIG. 5B, the relative thickness of the TiN membrane is approximately 0.14. Multiplying this by the inelastic mean free path values reported for similar titanium-based ceramics gives an estimated membrane thickness of 14 nm, which corroborates the thickness value of 10 nm calculated using ALD growth rates measured via ellipsometry.

The electron transparency of a membrane can be reported in terms of its electron transmission. Using the above log-ratio formula and the relative thickness of 0.14, the electron transmission of this membrane is approximately 0.87 at a 200 keV beam energy.

Dwyer and Harb (J. R. Dwyer and M. Harb, Appl. Spectrosc. 71, 2051 (2017)) estimated the electron transmission of SiN windows from theoretical elastic scattering cross-sections developed by Riley et al. (M. E. Riley, C. J. MacCallum, and F. Biggs, At. Data Nucl. Data Tables 15, 443 (1975)) for the 1 keV-256 keV energy range. They report that for a 200 keV beam, a 10 nm thick SiN window has an estimated electron transmission of approximately 0.76, 14% lower than our measured value. This suggests that the 10 nm TiN membrane is more electron transparent than a SiN membrane of the same thickness, giving evidence to the successful fabrication of an isolated, ultrathin membrane. Further, this suggests that the membranes can compete with the current state-of-the-art in terms of electron transparency, demonstrating their viability as thin, electron-transparent sample supports for various characterization methods. This advantage over SiN is enhanced by the electrical conductivity of TiN, which can mitigate beam charging and enhance image resolution and contrast. Four-point probe measurements taken on 55 nm thick TiN films deposited at 100° C. gave a resistivity value of $6\times10^{-5}$ ohm m, similar to that of graphite.

CONCLUSION

As described herein, a nanofabrication process can yield ultrathin membranes from a variety of materials using a single flexible and scalable method. The process was used to fabricate TiN membranes 4 nm-55 nm in thickness, characterization of which demonstrated electrical conductivity and a high electron transparency that can compete with SiN as the current state-of-the-art. Through the study of over-etching and residue removal, it was shown that the combination of support and sacrificial materials used allows for a selective and convenient membrane release, without the need to perfect the final etch or tune it to the specific material being released. Also described were the sources of residues on the back surface of the membrane and how to adjust the ALD deposition and backside release etches to prevent this.

Further details about the embodiments described herein can be found in M. J. Elowson et al., "Fabrication of ultrathin suspended membranes from atomic layer deposition films," Journal of Vacuum Science & Technology B 40, 023001 (2022), which is herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
   (a) providing a silicon wafer with a first silicon nitride layer disposed on a first side of the silicon wafer and a second silicon nitride layer disposed on a second side of the silicon wafer, a first side of the first silicon nitride layer being disposed on the first side of the silicon wafer;
   (b) patterning the second silicon nitride layer;
   (c) etching the silicon wafer to expose the first side of the first silicon nitride layer;
   (d) depositing a polymer on a second side of the first silicon nitride layer;
   (e) depositing a first ceramic layer on the polymer disposed on the second side of the first silicon nitride layer using an atomic layer deposition process, a first side of the first ceramic layer being disposed on the polymer; and
   (f) after operation (e), etching the first silicon nitride layer and the polymer to expose the first side of the first ceramic layer.

2. The method of claim 1, wherein operation (d) includes depositing the polymer on the first side of the first silicon nitride layer, and wherein operation (f) includes etching the polymer disposed on the first side of the first silicon nitride layer.

3. The method of claim 2, wherein etching the polymer disposed on the first side of the first silicon nitride layer is performed using an oxygen plasma.

4. The method of claim 2, wherein the polymer comprises a poly-para-xylylene.

5. The method of claim 1, wherein in operation (f) the first silicon nitride layer is etched using a fluorine-containing plasma, and wherein the polymer is etched using an oxygen plasma.

6. The method of claim 1, wherein in operation (c) the silicon wafer is etched using a potassium hydroxide solution.

7. The method of claim 1, further comprising:
before operation (d), depositing an adhesion layer on the second side of the first silicon nitride layer, wherein the adhesion layer is an adhesion layer from a group of 3-(trimethoxysilyl) propyl methacrylate, hexamethyldisilazane, 2-(methylthio)ethyl methacrylate, 4-chlorothiophenol, and (3-aminopropyl)triethoxysilane.

8. The method of claim 1, wherein the polymer is a polymer from a group of polymethyl methacrylate, a polyimide, and polystyrene.

9. The method of claim 1, wherein the first ceramic layer is a ceramic from a group of titanium nitride, niobium nitride, zirconium nitride, molybdenum nitride, tungsten nitride, tantalum nitride, hafnium nitride, vanadium nitride, scandium nitride, a ternary nitride compound including nitrogen and two elements from a group of titanium, niobium, zirconium, molybdenum, tungsten, aluminum, tantalum, hafnium, vanadium, scandium, yttrium, indium, gallium, calcium, and magnesium, aluminum oxide, cobalt oxide, hafnium oxide, molybdenum oxide, niobium oxide, silicon oxide, titanium oxide, tungsten oxide, magnesium oxide, zirconium oxide, tantalum oxide, vanadium oxide, scandium oxide, yttrium oxide, indium oxide, boron oxide, and gallium oxide.

10. The method of claim 1, wherein operation (c) creates a free-standing portion of the first silicon nitride layer.

11. The method of claim 1, wherein the first ceramic layer is about 1 nanometer to 100 nanometers thick.

12. The method of claim 1, wherein the polymer is about 100 nanometers to 400 nanometers thick.

13. The method of claim 1, wherein the silicon wafer is about 100 microns to 800 microns thick.

14. The method of claim 1, wherein the first silicon nitride layer and the second silicon nitride layer are each about 10 nanometers to 200 nanometers thick.

15. The method of claim 1, further comprising:
before operation (f), depositing a second ceramic layer on the first ceramic layer using an atomic layer deposition process, wherein the second ceramic layer comprises a different ceramic than the first ceramic layer.

16. The method of claim 15, further comprising:
before operation (f), depositing a third ceramic layer on the second ceramic layer, the third ceramic layer comprising a different ceramic than the first ceramic layer and the second ceramic layer.

17. The method of claim 15, further comprising:
before operation (f), depositing a third ceramic layer on the second ceramic layer, the third ceramic layer comprising a same ceramic as the first ceramic layer.

18. The method of claim 1, further comprising:
before operation (f), depositing a second polymer on the first ceramic layer; and
after operation (f), removing the second polymer disposed on the first ceramic layer.

19. The method of claim 18, wherein the second polymer is removed using a solvent.

20. A method comprising:
(a) providing a silicon wafer with a first silicon nitride layer disposed on a first side of the silicon wafer and a second silicon nitride layer disposed on a second side of the silicon wafer, a first side of the first silicon nitride layer being disposed on the first side of the silicon wafer;
(b) patterning the second silicon nitride layer;
(c) etching the silicon wafer to expose the first side of the first silicon nitride layer to create a free-standing portion of the first silicon nitride layer;
(d) depositing a polymer on a second side of the first silicon nitride layer;
(e) depositing a first ceramic layer on the polymer disposed on the second side of the first silicon nitride layer using an atomic layer deposition process, a first side of the first ceramic layer being disposed on the polymer; and
(f) etching the first silicon nitride layer and the polymer to expose the first side of the first ceramic layer.

* * * * *